I. C. ROBINSON.
SAFETY FENDER FOR STREET CARS OR AUTOMOBILES.
APPLICATION FILED APR. 19, 1915.

1,179,039.

Patented Apr. 11, 1916.

Inventor:
Ivan Chauncey Robinson

UNITED STATES PATENT OFFICE.

IVAN CHANCE ROBINSON, OF ST. LOUIS, MISSOURI.

SAFETY-FENDER FOR STREET-CARS OR AUTOMOBILES.

1,179,039. Specification of Letters Patent. Patented Apr. 11, 1916.

Application filed April 19, 1915. Serial No. 22,441.

*To all whom it may concern:*

Be it known that I, Ivan C. Robinson, a citizen of the United States, residing at St. Louis, in the State of Missouri, have invented a new and useful Safety-Fender for Street-Cars or Automobiles, of which the following is a specification.

The present invention relates to improvements in fenders, the primary object of the invention being the provision of an attachment for street cars and automobiles, which is adapted under normal conditions to operate as a life saver.

The further object of the present invention is the provision of a bumper or fender adapted to be connected to the forward end of the car or automobile, and so positioned as to prevent an object from passing below the fender, to the wheels of the car or automobile.

A still further object of the present invention is the provision of a fender having a soft back to bump against, which moves backward when struck, and prevents any rebound.

Figure 1:
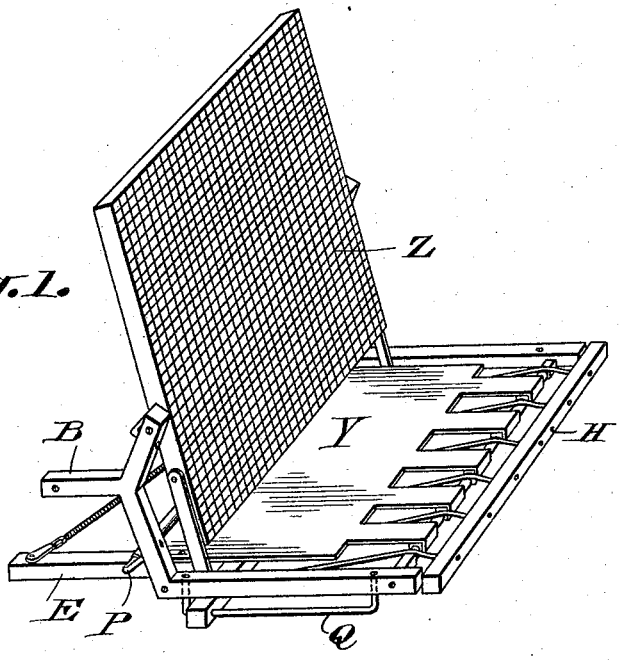
Figure 2:
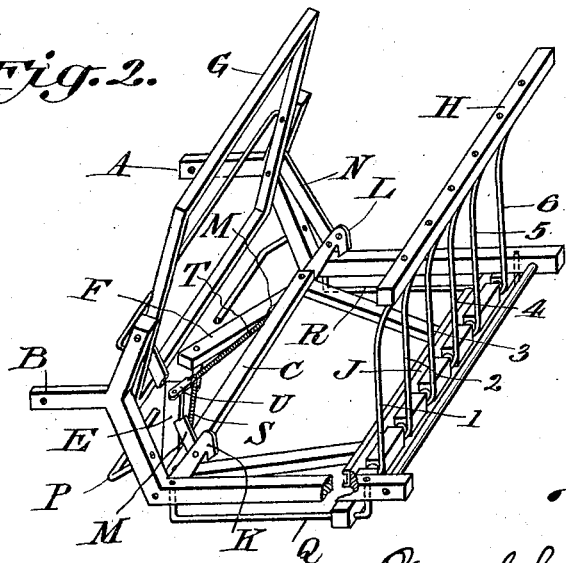

In the drawing, Figure 1 is a perspective view of the fender in open position to receive an object. Fig. 2 is a view of the fender closed and the bumper frame without the usual netting and the bottom of the fender removed.

Referring to the drawings —Z— (Fig. 1) represents the netting that covers the bumper frame and —Y— the sheet iron bottom made with 6 openings through which pass the connecting rods 1—2—3—4—5 and 6 of the front protector. The bottom is connected around the front connecting rod of the main frame, then to the top of connecting rod —C— and then around connecting rod —P—.

In Fig. 2 —A— and —B— designate the main side frames, and are connected by 4 connecting rods having a round part on each end in a rivet or bolt form, with a shoulder. Connecting rod —C— is square and has 2 round parts, on each end, one in a rivet or bolt form with a round shoulder, the other round part is larger than the part that rivets or bolts and has a square shoulder. The square bumper frame —G— is pivoted in the top of the main frame so as to swing back and forth. To bumper frame —G— is connected two connecting bars —N— and —M— which connect to two dogs —L— and —K— by means of a rivet or a bolt. The two dogs —L— and —K— are made in the form of a hook, with a round hole in the back end to fit in on the round part on each end of connecting bar —C—, so as to revolve as bumper frame —G— swings back and forth as bumper frame —G— is moved to just over center, and as bumper frame —G— swings forward, the two dogs —L— and —K— are forced down in front of back bar —J— of the front protector holding it in a horizontal position. Two L-shaped levers, with a long and short end —E— and —F— are connected on the bottom of connecting bar —C— with the long end backward by means of a rivet or a bolt so as to swing back and forth, the short end fitting in a flat bottom trough, connected to the back of bar —J— of the front protector. The two coil springs —S— and —T— connect one on the top of lever —E— and one on the bottom of lever —F— at the long end and the other terminals are one on the top of lever —F— between lever —F— and connecting bar —C— and one on the bottom of lever —E— where it connects to connecting bar —C—. The two springs —S— and —T— are attached to the levers —E— and —F— and bar —C,— respectively by means of 4 eyes —U— with a hole in each end, and put on so as to move back and forth as the levers change positions, by means of a pivot rivet or bolt. The front protector is composed of back bar —J— which has a flat bottomed trough attached to the back of it, by means of rivets or bolts, front bar —H—, and 6 connecting rods, 1—2—3—4—5 and 6 and is supported by two U-shaped hangers —Q— and —R— which are fastened to the bottom of main frame —A— and —B—. The U-shaped hangers —Q— and —R— are made with a rounded bearing part on each end with a shoulder in form of a rivet or a bolt. The back bar —J— of the front protector has a hole in each end, through which the hangers pass, allowing the front protector to move back and forth. Back bar —J— also has 6 round parts around which the flattened ends of the 6 connecting rods 1—2—3—4—5 and 6 that connect back bar —J— to the tripper bar —H— are bent, so as to revolve, the 6 connecting rods 1—2—3—4—5 and 6 being made with a round part at the top end with a shoulder in rivet or bolt form so as to connect back bar —J— to tripper bar —H—. By the back bar —J— moving forward the front protector is placed in an upright position and the forward and backward movement of the front protector is regulated by the length of the two hangers —Q— and —R—.

It is thought that from the foregoing description and drawing my improved car and automobile fender will be clearly comprehended and while the illustrated embodiment of the invention is believed at this time to be preferable I wish to be distinctly understood as reserving to myself the right to effect such changes, modifications and variations of the illustrated structure as may fall properly within the scope of the protection prayed.

What I claim is,—

1. The combination with means, for connecting the fender to the forward portion of the car or automobile, of a fender having a movable bumper frame supported by the connecting means, a movable front protector frame connected to the main frame, on the bottom so that as the bumper frame moves backward the front protector frame moves forward automatically, springs for moving the front protector frame to an upright position and means for manually locking the bumper frame in a slanting position and the front protector frame in a horizontal position against the tension of the springs.

2. A fender having a stationary main frame, a movable bumper frame connected to the main frame, and capable of moving backward and forward between the main side frames, a front protector frame capable of moving toward the front of the main frame, springs for moving and holding the front protector in an upright position and means for manually locking the front protector in a horizontal position.

3. A non collapsible fender having a movable bumper frame, a movable front protector frame and a main frame which connects to the car, comprising two approximately Y-shaped arms, 4 connecting rods two straight rods connecting the bottom portion and two with rectangular bends connecting the back portion of the Y shaped arms.

4. A non collapsible fender having a movable bumper frame, a movable front protector frame and comprising two approximately Y-shaped arms, 4 connecting rods two straight rods connecting the bottom portion and two rods with rectangular bends connecting the back portion of the Y-shaped arms, the two levers for forcing the front protector to an upright position and two coiled springs connected at the back of the main frame, and to the long ends of the levers.

5. A fender composed of a main frame, a bumper frame and a front protector frame, the bumper frame being pivotally connected to the main frame at opposite points, springs connected to a pair of levers that move against the back of the front protector, to force the front protector forward and upward, the tension of the springs being released automatically when the bumper frame is moved backward at the bottom, means for limiting the forward and backward movement of the bumper frame and to retain it in a slanting position just over center, the front protector frame being supported on the bottom of the main frame by two hangers, means of raising and retaining the front protector in an upright position manually operated means for locking the front protector in a horizontal position against the tension of the springs, means for automatically releasing said locking means and means for connecting the fender to the car or automobile.

In testimony that I claim the foregoing as my own, I have hereto affixed my signature in the presence of two witnesses.

IVAN CHANCE ROBINSON.

Witnesses:
 WILLIAM T. KEIL,
 LEE JACKSON.

Copies of this patent may be obtained for five cents each, by addressing the "Commissioner of Patents, Washington, D. C."